(12) United States Patent
Nieh et al.

(10) Patent No.: US 8,402,318 B2
(45) Date of Patent: Mar. 19, 2013

(54) SYSTEMS AND METHODS FOR RECORDING AND REPLAYING APPLICATION EXECUTION

(75) Inventors: Jason Nieh, New York, NY (US); Nicolas Viennot, New York, NY (US); Oren Laadan, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 396 days.

(21) Appl. No.: 12/729,944

(22) Filed: Mar. 23, 2010

(65) Prior Publication Data

US 2010/0251031 A1    Sep. 30, 2010

Related U.S. Application Data

(60) Provisional application No. 61/162,873, filed on Mar. 24, 2009.

(51) Int. Cl.
*G06F 11/00* (2006.01)
(52) U.S. Cl. ........... 714/38.1; 714/15; 714/46; 717/124; 717/127; 717/131; 717/132
(58) Field of Classification Search ............ 714/46, 714/38.1
See application file for complete search history.

(56) References Cited

U.S. PATENT DOCUMENTS

| | | | |
|---|---|---|---|
| 7,823,153 B1* | 10/2010 | Pashenkov et al. | 718/100 |
| 2006/0248386 A1* | 11/2006 | Barga et al. | 714/15 |
| 2008/0046696 A1* | 2/2008 | Vertes | 712/214 |
| 2008/0155299 A1* | 6/2008 | Vertes et al. | 713/600 |
| 2008/0270770 A1* | 10/2008 | Vertes et al. | 712/227 |
| 2008/0301417 A1* | 12/2008 | Law et al. | 712/227 |
| 2009/0119549 A1* | 5/2009 | Vertes | 714/47 |
| 2009/0133033 A1* | 5/2009 | Lindo et al. | 718/108 |
| 2009/0144742 A1* | 6/2009 | Subhraveti et al. | 718/104 |
| 2009/0147010 A1* | 6/2009 | Russell et al. | 345/473 |
| 2009/0248381 A1* | 10/2009 | Liu et al. | 703/13 |
| 2009/0249357 A1* | 10/2009 | Chanda et al. | 719/314 |
| 2009/0254724 A1* | 10/2009 | Vertes et al. | 711/162 |
| 2009/0320011 A1* | 12/2009 | Chow et al. | 717/154 |
| 2009/0327574 A1* | 12/2009 | Xu et al. | 711/6 |
| 2009/0327995 A1* | 12/2009 | Guo et al. | 717/106 |
| 2009/0328044 A1* | 12/2009 | Bergheaud et al. | 718/101 |
| 2010/0005464 A1* | 1/2010 | Malyugin et al. | 718/1 |
| 2010/0107158 A1* | 4/2010 | Chen et al. | 718/1 |
| 2010/0180245 A1* | 7/2010 | Rutten | 716/6 |

OTHER PUBLICATIONS

Laadan, O. et al., "Operating System Virtualization: Practice and Experience," In Proceedings of the 3rd Annual Haifa Experimental Systems Conference (SYSTOR), May 2010, pp. 1-12.
Bacon, D.F. et al., "Hardware-Assisted Replay of Multiprocessor Programs," In Proceedings of the 1991 ACM/ONR Workshop on Parallel and Distributed Debugging, May 1991.
Balzer, R.M. "EXDAMS: Extendable Debugging and Monitoring System," In Proceedings of the AFIPS Spring Joint Computer Conference, May 1969.

(Continued)

*Primary Examiner* — Chae Ko
(74) *Attorney, Agent, or Firm* — Wilmer Cutler Pickering Hale and Dorr LLP

(57) ABSTRACT

A method for recording and replaying execution of an application running on a computer system using a program module is provided. The method includes recording events which result from the execution of the application including a non-deterministic event, wherein the program module deterministically records the non-deterministic event, saving the recorded events for deterministic replay of the recorded execution, restoring the saved recorded events, and deterministically replaying the recorded execution of the application.

20 Claims, 12 Drawing Sheets

OTHER PUBLICATIONS

Bergheaud, P. et al., "Fault Tolerance in Multiprocessor Systems Via Application Cloning," In Proceedings of the 27th International Conference on Distributed Computing Systems (ICDCS), Jun. 2007.

Bressoud, T.C. "TFT: A Software System for Application-Transparent Fault Tolerance," In Proceedings of the 28th Annual International Symposium on Fault-Tolerant Computing, Jun. 1998.

Bressoud, T.C. et al., "Hypervisor-Based Fault Tolerance," In Proceedings of the 15th Symposium on Operating Systems Principles (SOSP). Dec. 1995.

Choi, J.D. et al., "Deterministic Replay of Java Multithreaded Applications," In Proceedings of the 15th Symposium on Operating Systems Principles (SOSP), Dec. 1995.

Courtois, P.J. et al., Concurrent Control with "Readers"and "Writers," Communications of the ACM, 14(10), 1971.

Devietti, J. et al., "DMP: Deterministic Shared Memory Multiprocessing," In Proceedings of the 14th International Conference on Architectural Support for Programming Languages and Operating Systems (ASPLOS), Mar. 2009.

Dunlap, G.W. et al., "ReVirt: Enabling Intrusion Analysis Through Virtual-Machine Logging and Replay,"In Proceedings of the 5th Symposium on Operating Systems Design and Implementation (OSDI), Dec. 2002.

Dunlap, G.W. et al., "Execution Replay of Multiprocessor Virtual Machines," In Proceedings of the 4th International Conference on Virtual Execution Environments (VEE), Mar. 2008.

Geels, D. et al., "Replay Debugging for Distributed Applications," In Proceedings of the 2006 USENIX Annual Technical Conference, Jun. 2006.

Guo, Z. et al., "R2: An Application-Level Kernel for Record and Replay," In Proceedings of the 8th Symposium on Operating Systems Design and Implementation (OSDI), Dec. 2008.

Hower, D.R. et al., "Rerun: Exploiting Episodes for Lightweight Memory Race Recording," In Proceedings of the 35th International Symposium on Computer Architecture (ISCA), Jun. 2008.

Laadan, O. et al., "DejaView: A Personal Virtual Computer Recorder," In Proceedings of the 21st Symposium on Operating Systems Principles (SOSP), Oct. 2007.

Laadan, O. et al., "Transparent Checkpoint-Restart of Multiple Processes on Commodity Operating Systems," In Proceedings of the 2007 USENIX Annual Technical Conference, Jun. 2007.

Leblanc, T.J. et al., "Debugging Parallel Programs with Instant Replay," IEEE Transactions on Computers, C-36(4), Apr. 1987.

Lee, D. et al., "Respec: Efficient Online Multiprocessor Replay via Speculation and External Determinism," ASPLOS' 10, Mar. 13-17, 2010, Pittsburgh, Pennsylvania, USA.

Montesinos, P. et al. "Capo: a Software-Hardware Interface for Practical Deterministic Multiprocessor Replay," In Proceedings of the 14th International Conference on Architectural Support for Programming Languages and Operating Systems (ASPLOS), Mar. 2009.

Montesinos, P. et al., "DeLorean: Recording and Deterministically Replaying Shared-Memory Multiprocessor Execution Efficiently," In Proceedings of the 35th International Symposium on Computer Architecture (ISCA), Jun. 2008.

Narayanasamy, S. et al., "BugNet: Continuously Recording Program Execution for Deterministic Replay Debugging," In Proceedings of the 32nd International Symposium on Computer Architecture (ISCA), Jun. 2005.

Narayanasamy, S. et al., "Recording Shared Memory Dependencies Using Strata," In Proceedings of the 14th International Conference on Architectural Support for Programming Languages and Operating Systems (ASPLOS), Mar. 2009.

Olszweski, M. et al., "Kendo: Efficient Deterministic Multithreading in Software," In Proceedings of the 14th International Conference on Architectural Support for Programming Languages and Operating Systems (ASPLOS), Mar. 2009.

Osman, S. et al., "The Design and Implementation of Zap: A System for Migrating Computing Environments," In Proceedings of the 5th Symposium on Operating System Design and Implementation (OSDI), Dec. 2002.

Russinovich, M. et al., "Replay for Concurrent Non-Deterministic Shared-Memory Applications," In Proceedings of the SIGPLAN Conference on Programming Language Design and Implementation (PLDI), May 1996.

Saito, Y. "Jockey: a User-Space Library for Recording-Replay Debugging," In Proceedings of the 6th International Symposium on Automated Analysis-Driven Debugging, Sep. 2005.

Slye, J.H. et al., "Supporting Nondeterministic Execution in fault-Tolerant Systems," In Proceedings of the 26th Annual International Symposium on Fault-Tolerant Computing, 1996.

Srinivasan, S.M. et al., "Flashback: A Lightweight Extension for Rollback and Deterministic Replay for Software Debugging," In Proceedings of the 2004 USENIX Annual Technical Conference, Jun. 2004.

Thane, H. et al., "Using Deterministic Replay for Debugging of Distributed Real-Time Systems," In Proceedings of the 12th Euromicro Conference on Real-Time System, Jun. 2000.

Xu, M. et al., "A 'Flight Data Recorder' for Enabling Full-System Multiprocessor Deterministic Replay," In Proceedings of the 30th International Symposium on Computer Architecture (ISCA), Jun. 2003.

Stodden et al., "Hardware Instruction Counting for Log-based Rollback Recovery on x86-family Processors," In Proceedings of the 3rd International Service Availability Symposium (ISAS), LNCS 4328, pp. 106-119 (2206) 2006.

\* cited by examiner

| | Record (action) → | Event log → | Replay (action) | User-space |
|---|---|---|---|---|
| (a) | ret = gettimeofday(KTV, NULL) (system call returned) copy out: KTV→utv (size) return(ret) | syscall_ret(ret) copy_data(size) | (do nothing) copy out: KTV→utv (size) return(ret) | gettimeofday(&utv, NULL) |

FIG. 4A

| | Record (action) → | Event log → | Replay (action) | User-space |
|---|---|---|---|---|
| (b) | copy in: ubuf→KBUF (size) rendezvous(A, fd.inode) ret = write(fd, KBUF, size) (system call returned) return(ret) ... rendezvous(B, fd.inode) ret = read(fd, KBUF, size) return ret copy out: KBUF→ubuf (size) return(ret) | (A) rendezvous(SEQ) (A) syscall_ret(ret) ... (B) rendezvous(SEQ+1) (B) syscall_ret(ret) | copy in: ubuf→KBUF (size) rendezvous(A, fd.inode) ret = write(fd, KBUF, size) (system call returned) return(ret) ... rendezvous(B, fd.inode) ret = read(fd, KBUF, size) return ret copy out: KBUF→ubuf (size) return(ret) | (A) write(fd, ubuf, size) ... (B) read(fd, ubuf, size) |

FIG. 4B

```
    ...
    do {
        down(mutex);
        select(fd, ...);        /* test if fd is ready */
        if (fd ready)
            ret = syscall(fd, ...);
        up(mutex);
    } while (!done);
    ...
```

FIG. 5

|     | Record (action) → | Event log | Replay (action) | User-space |
|---|---|---|---|---|
| (a) | (do nothing) return(0) ... kill(B, sig) | (queue sig on B) (A) syscall_ret(0) ... (B) signal_received(sig) | (do nothing) return(0) ... kill(B, sig) | (A) kill(B, sig) ... (B) sync point |

FIG. 6A

|     | Record (action) → | Event log | Replay (action) | User-space |
|---|---|---|---|---|
| (b) | (A) (stall) ... (B) (adjust PTE) (A) (adjust PTE) (A) read page ADDR | (queue ADDR on B) ... (B) page_own_read(ADDR) (A) page_own_read(ADDR) | (A) (stall) ... (B) (adjust PTE) (A) (adjust PTE) (A) read page ADDR | (B) write page ADDR (A) read page ADDR ... (B) sync point (B) woken up |

FIG. 6B

SYSTEMS AND METHODS FOR RECORDING AND REPLAYING APPLICATION EXECUTION

CROSS-REFERENCE TO RELATED APPLICATIONS

This application claims the benefit of U.S. Provisional Patent Application No. 61/162,873, filed Mar. 24, 2009, which is hereby incorporated by reference herein in its entirety.

BACKGROUND

Deterministic application record and replay is the ability to record application execution and deterministically replay it at a later time. This record-replay capability can provide many potential benefits related to systems development, testing, and maintenance.

For instance, the record-replay capability can be used for diagnosing and debugging applications by capturing and reproducing hard-to-find bugs. In addition, it can be used for intrusion analysis by capturing intrusions involving non-deterministic effects. It can also be used for implementing fault-tolerance by providing replicas that replay execution and go live at the occurrence of a fault in place of the previously running application instance.

Given such potential benefits, different approaches have been considered and devised for providing the record-replay functionality. These previous approaches, however, have certain limitations, including the inability to provide low-overhead record-replay for unmodified applications on commercially available, unmodified multi-processor systems and operating systems.

For example, hardware approaches require hardware modifications and thus do not work on commercially available, unmodified hardware. Virtual machine approaches, for example, provide transparent record-replay, but incur high overhead on multiprocessor systems. Operating system approaches, for example, require extensive kernel modifications and are unable to capture many non-deterministic events during recording of application execution. Programming language mechanisms, for example, do not support applications written in languages that do not provide record-replay primitives. Furthermore, application-level and library-level approaches, for example, provide record-replay for only some applications and require application and library modifications.

SUMMARY

Systems and methods for recording and replaying application execution are provided. The disclosed subject matter allows for low-overhead, transparent, and deterministic execution recording and replaying of multi-threaded and multi-processor applications on commercially available, unmodified multiprocessor systems and operating systems.

In one embodiment, a method for recording and replaying execution of an application running on a computer system using a program module is provided. The method includes recording events which result from the execution of the application including a non-deterministic event, wherein the program module deterministically records the non-deterministic event, saving the recorded events for deterministic replay of the recorded execution, restoring the saved recorded events, and deterministically replaying the recorded execution of the application. In one example of the method, the recorded events are saved in a permanent storage. In another example of the method, the program module is a dynamically loaded kernel module.

In one example of the method, the program module provides a virtual execution environment that encapsulates one or more processes of the application in a self-contained unit. In this example, the method further includes suspending live execution of the application, saving a live execution state of the application, and resuming execution of the application in the virtual execution environment for record and replay of the resumed execution.

In one example of the method, the non-deterministic event includes a set of system calls made by more than one process of the application for accessing a shared resource. In this example, the program module deterministically records the set of system calls by recording a partial ordering of only those system calls in the set that are related based on system call dependencies with respect to accessing the resource for subsequent deterministic replay of the system call events. The program module also deterministically replays the recorded execution of the application by enforcing the recorded partial ordering of the related system calls using a synchronization mechanism. In this example, the synchronization mechanism can be a mutex.

In one example of the method, the non-deterministic event includes a signal addressed to a recipient process of the application. In this example, the program module deterministically records the signal by deferring the recording of the signal until the recipient process reaches a deterministic execution point for subsequent deterministic replay of the non-deterministic signal. The program module also deterministically replays the recorded execution by retrieving the recorded signal when the replayed recipient process reaches the deterministic execution point. In this example, the deterministic execution point can be an execution point at which the recipient process enters kernel mode.

In one example of the method, the non-deterministic event includes a request for transfer of access right to a page in a shared memory to an owner process that owns the access right. In this example, the program module deterministically records the request by deferring the recording of the request until the owner process reaches a deterministic execution point for subsequent deterministic replay of the request. The program module also deterministically replays the recorded execution by retrieving the recorded request when the owner process reaches the deterministic execution point. In this example, the deterministic execution point can be an execution point at which the recipient process enters kernel mode.

In another example, the method further includes stopping the replaying of the recorded execution of the application and restarting the recording of the execution of the application.

In another embodiment, a system for recording and replaying execution of an application is provided. The system includes a processor for running the application and a program module, wherein the program module is configured to record events which result from the execution of the application including a non-deterministic event, wherein the program module deterministically records the non-deterministic event, save the recorded events for deterministic replay of the recorded execution, restore the saved recorded events, and deterministically replay the recorded execution of the application.

BRIEF DESCRIPTION OF THE DRAWINGS

FIG. 4A is an illustrative chart showing recording and replaying of system calls that transfer non-deterministic data from kernel space to application space in accordance with some embodiments of the disclosed subject matter.

FIG. 4B is an illustrative chart showing recording and replaying of system calls that access shared resources in accordance with some embodiments of the disclosed subject matter.

FIG. 5 is an illustrative list showing pseudo code for blocking system calls in accordance with some embodiments of the disclosed subject matter.

FIG. 6A is an illustrative chart showing recording and replaying of a non-deterministic signal in accordance with some embodiments of the disclosed subject matter.

FIG. 6B is an illustrative chart showing recording and replaying of non-deterministic shared memory interleavings in accordance with some embodiments of the disclosed subject matter.

DETAILED DESCRIPTION

Systems and methods for transparent, deterministic recording and replaying of multi-threaded, multi-process applications are provided. In some embodiments of the disclosed subject matter, systems and methods are provided for transparent, deterministic recording and replaying of multi-threaded, multi-process application using lightweight operating system mechanism and checkpoint-restart mechanism.

The systems and methods for transparent, deterministic recording and replaying of application execution can be implemented without modifying, re-linking, or recompiling applications, libraries, or operating system kernels and without any specialized hardware.

Figure 1:
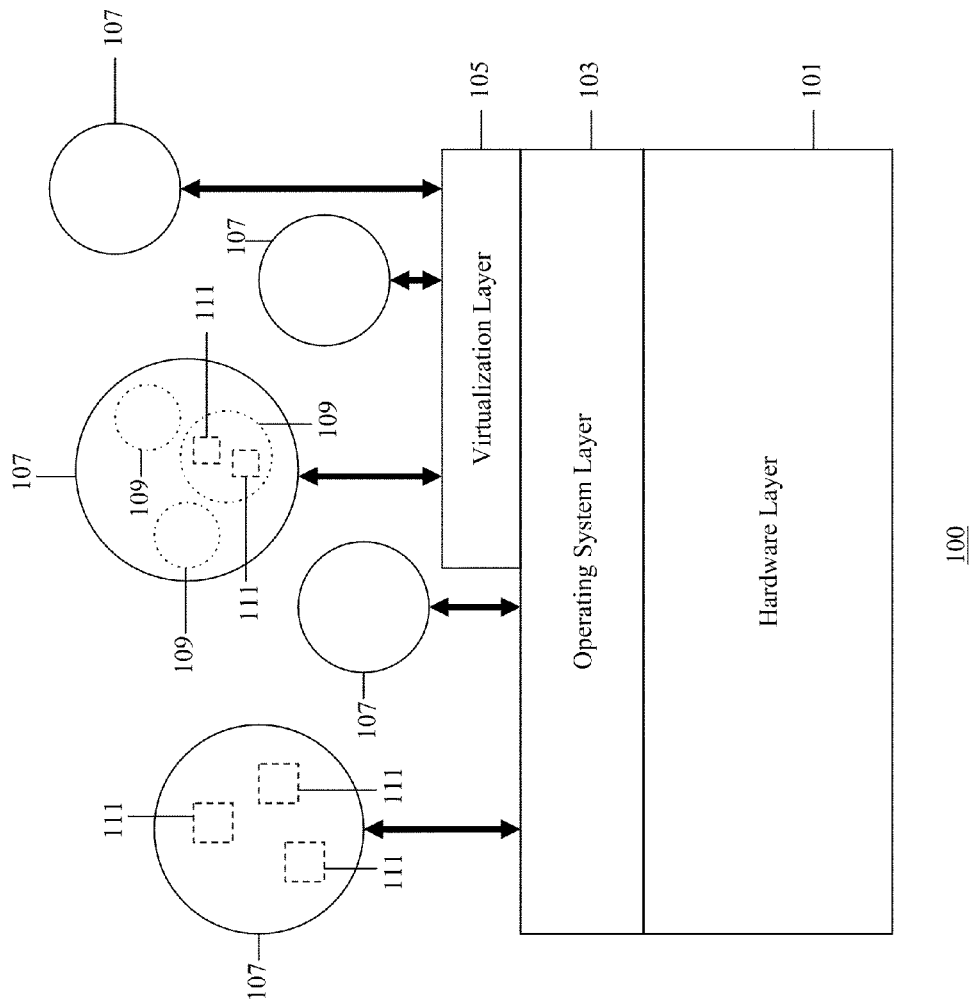
FIG. 1 is an illustrative diagram showing an computer system used for implementing systems and methods for application execution recording and replaying in accordance with some embodiments of the disclosed subject matter.

FIG. 1 is an illustrative diagram showing a computer system 100 that can be used for implementing transparent, deterministic application execution recording and replaying systems and methods in accordance with some embodiments of the disclosed subject matter. Referring to FIG. 1, computer system 100 includes, among other things, a hardware layer 101, an operating system layer 103, a virtualization layer 105, and one or more applications 107 that are running on the system 100.

The computer system 100 may include various computing devices, such as, for example, a hand-held device, a desktop, a laptop, a workstation, an enterprise server, and other general- and special-purpose computers and devices. The hardware layer 101 may include, for example, single- or multi-processor core, volatile and non-volatile memory, disks and other permanent storage, interface controllers, and any other suitable hardware components.

The operating system layer 103 includes an operating system that provides a uniform execution environment and hardware interface for the applications 107 running on the system 100. The applications 107 include single process applications and multi-process applications. The multi-process applications include more than one process 109. Some of the processes 109 may in turn include multiple execution threads 111, or multi-threads.

The virtualization layer 105 provides a virtual execution environment for execution of the applications 107 that are targeted for recording and replaying. The virtualization layer 105 supports application checkpoint mechanisms, such as checkpoint-restart.

The virtualization layer 105 presents a host-independent, virtualized view of the system 100. This allows the targeted applications 107 to make full use of the services provided by the operating system layer 103 and still be checkpointed for recording execution of an application 107 at any point in time and restarted for replaying the recorded execution at a later time, either on the same machine or a different one.

Application checkpoint-restart is the ability to save the state of a running application to a permanent, secondary storage so that the application can later resume its execution from the time at which it was checkpointed. The application checkpoint-restart mechanism utilizes the virtualization layer 105, which resides on top of the operating system layer 103, to encapsulate in a virtual execution environment the applications 107 that are targeted for execution recording or replaying, thereby decoupling the application processes 109 and/or the execution threads 111 from the operating system layer 103.

The application checkpoint-restart enables the applications 107 to be recorded and replayed from any point in time. The application checkpoint-restart enables an application 107 to switch from being replayed to running live at any point in time such that the application 107 can proceed with normal execution from that point going forward.

Figure 2:
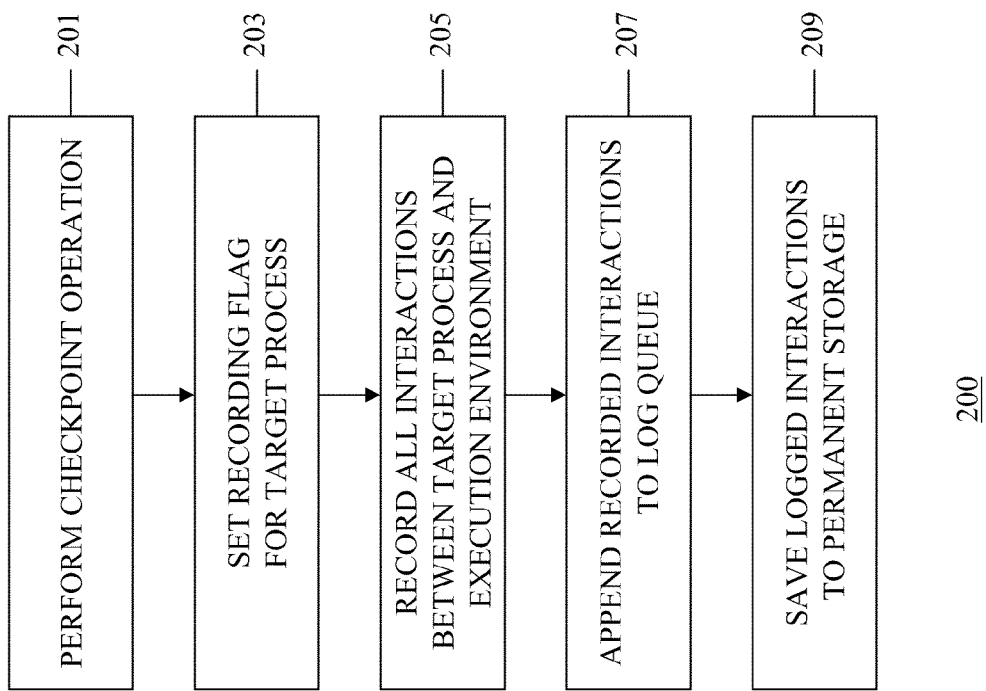
FIG. 2 is an illustrative diagram of a process for recording the execution of an application in accordance with some embodiments of the disclosed subject matter.

FIG. 2 is an illustrative diagram illustrating a process 200 for recording the execution of an application in accordance with some embodiments of the disclosed subject matter. Referring to FIG. 2, in order to start recording execution of an application 107, for example, a checkpoint operation is performed at 201. To perform a checkpoint operation, for example, a dedicated monitor process is started to freeze all processes 109 of the application 107 in a session, save the state of the processes 109, and take a file-system snapshot. A session is a collection of processes, such as processes 109 of FIG. 1, targeted for recording or replaying that are isolated within a virtual execution environment provided by a virtualization layer, such as virtualization layer 105 of FIG. 1.

At 203, a recording flag is set for each process 109 of the application 107 targeted for recording. To begin recording, for instance, the dedicated monitor process attaches itself to each process 109 in the target application 107 and sets a special recording flag to indicate that the process is being recorded.

The recording flag is inherited to child processes, or new execution threads, of the recorded processes 109 such that the child processes or new threads automatically become part of the relevant session.

At 205, all interactions of the recorded processes 109 with their execution environment, also referred to as events, are recorded, including all non-deterministic events. Non-deterministic events include, for example, non-deterministic machine instructions, system calls, signals, and shared memory interleavings. For example, stubs are interposed between the targeted processes 109 and key operating system kernel entry points to perform some processing before and after the entry points are accessed. When a recorded process 109 executes a system call, for instance, events describing the system call and its outcome are produced by recording information about the system call arguments before and after the system call executes.

At 207, the recorded interactions between the target processes 109 and their execution environment, including non-deterministic events, are stored in log queues. For example, a private kernel log queue is created for each recorded process 109 in the session. The private log queues are filled with recorded events as the target processes 109 execute in the virtual execution environment of the relevant session.

At 209, the recorded events appended to the private log queues are stored in permanent storage. For example, as the recorded processes 109 fill their private log queues, the dedicated monitor process pulls the recorded events from the log queues and saves them to permanent storage. In some embodiments, the recorded events are saved in a memory or permanent storage device located in another computer system. Recording of a process ends when the process exits, or when the monitor process stops the recording.

Each event that is recorded and replayed includes at least two fields: event type and payload. In some embodiments of the disclose subject matter, the events are not time-stamped. In such embodiments, it is the dependencies between the events that are tracked to preserve the partial order of related events, not the exact scheduling order of the events.

Table 1 provides an illustrative list of event types that can be recorded and replayed. These events account for sources of non-deterministic execution that are needed to support deterministic replay. In certain environments, list provided in Table 1 may account for all sources of non-deterministic execution that are needed to support deterministic replay.

Replaying of a session can start at the beginning of its execution. It can also start from a restart checkpoint.

At 303, a replaying flag is set for each process 109 of the application 107 targeted for replaying in the session. To begin replaying, the dedicated monitor process launches new processes, or restarts the desired session from a desired checkpoint, and marks all targeted processes with a special replaying flag.

When a recorded session is restarted for a replay, a new container, or a virtual execution environment, is created for the session, the file-system configuration is restored by unifying a new read-write layer with the recorded file-system snapshot, and the recorded processes are restored.

At 305, log queues are allocated for the session to be replayed. For example, the monitor process creates a private kernel log queue for each process 109 in the replayed session.

At 307, the log queues are restored. For example, the monitor process reads the recorded events from permanent storage and places the events in the respective private log queue for each process 109 to be replayed. In some embodiments, the recorded events are read from a memory or permanent storage device located in another computer system. If the monitor process encounters an event for a process that has not yet been created, it creates an orphan log queue, which it attaches to the respective process when the process is created later.

At 309, the processes 109 in the stored session are run. For example, the recorded events placed in the log queues are consumed to steer the processes 109 to follow the same execution path they had during recording.

The same stubs used for recording execution are used for replaying by interposing the stubs between the targeted processes 109 and key operating system kernel entry points. When a system call is invoked at replay, for example, the corresponding event is consumed by the respective process from its private kernel log queue to determine how to correctly replay the effect of the system call. Replay of a process ends when the process terminates, or when all the recorded events have been consumed.

The replayed session can also go live by having the monitor process flush all remaining events in the log queues. During replay, for example, the virtual execution environment maintains a mapping between virtual and real operating systems identifiers, such as processor identifiers and file descriptors, so that the replayed session can be switched to live execution at any time.

As shown in the illustrative processes 200, 300 of recording and replaying application executions, the systems and

TABLE 1

List of events and their specific payload

| Event | Description | Payload |
| --- | --- | --- |
| hw_inst | hardware instruction trap | op-code and data, e.g. RDTSC and 64-bit counter value |
| syscall_ret | system call return | system call return value |
| copy_data | data transfer to user-space | size of data transfer |
| rendezvous | resource synchronization | resource sequence number |
| signal_receive | process received signal | signal number, whether or not in system call, signal data |
| async_reset | force a sync point | process user-space signature at forced sync point |
| page_public | make page public (not owned) | page address |
| page_shared_read | make page shared read-only | page address, page sequence number |
| page_own_write | make page owned read/write | page address, page sequence number |

Figure 3:
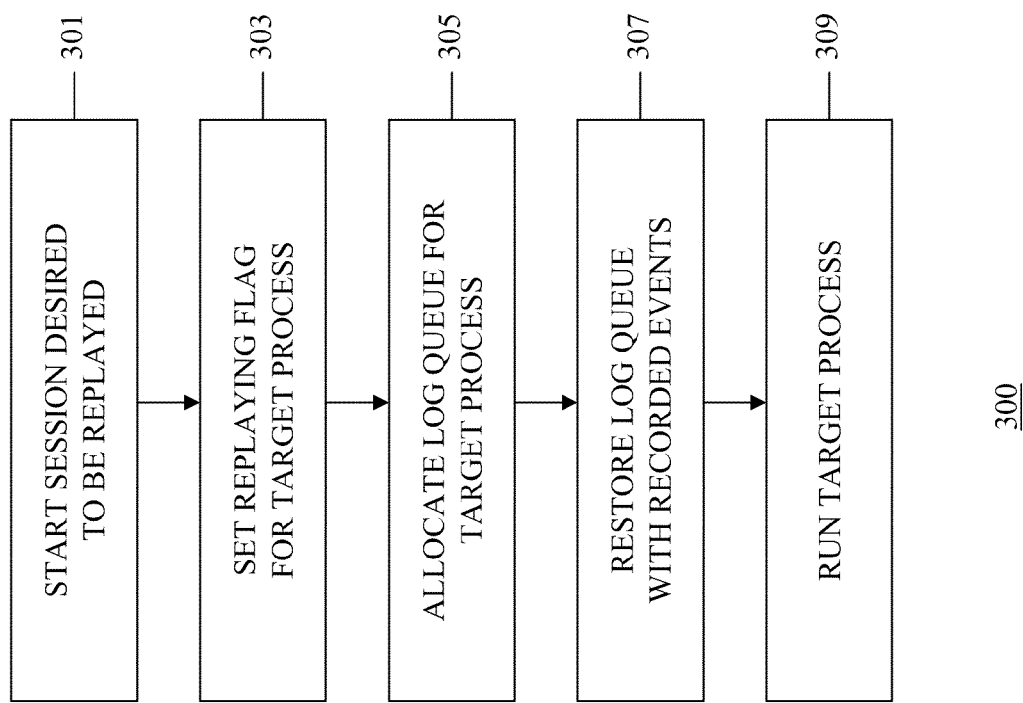
FIG. 3 is an illustrative diagram of a process for replaying a recorded execution of an application in accordance with some embodiments of the disclosed subject matter.

FIG. 3 is an illustrative diagram of a process 300 for replaying a recorded execution of an application in accordance with some embodiments of the disclosed subject matter. Referring to FIG. 3, replaying of a desired session is started at 301.

methods disclosed herein utilize operating system mechanism to provide lightweight, transparent, and deterministic execution recording and replaying of multi-threaded and multi-process applications with low-overhead.

For example, the operation of the disclosed systems and methods at the well-defined interface between the multi-process and/or multi-threaded applications 107 and the operating system to record and replay the execution allows for recording and replaying the execution of multiple processes 109 and threads 111.

Using a standard interface that the applications 107 already use allows transparency by avoiding the need to modify the applications 107 for recording and replaying. Using a high-level interface helps reduce overhead by avoiding the need to track and record the low-level, non-deterministic effects associated with the hardware and the operating system.

Handling non-deterministic execution without incurring high overhead is a challenge for providing lightweight, deterministic execution recording and replaying. Lightweight mechanisms are disclosed herein to address the challenge of handling non-deterministic executions associated with execution events, such as systems calls, signals, and shared memory interleavings. For example, a rendezvous points mechanism is used to make a partial ordering of execution based on system call dependencies sufficient for replay, thereby avoiding the recording overhead of having to maintain an exact execution ordering.

For asynchronous interactions that can occur at arbitrary times, such as signals and shared memory interleavings, a sync points mechanism is used to convert asynchronous interactions into synchronous events that are easier to record and replay. For instance, it has been observed that applications perform frequent system activities, such as input/output (I/O) operations. These system activities can be recorded efficiently with relative ease because their timing is synchronous with the execution of the processes performing the activities. The sync points mechanism uses these system activities to convert non-deterministic asynchronous interactions, which are difficult to record and replay efficiently without additional hardware support, into synchronous interactions that can be recorded with low overhead.

Non-deterministic hardware instructions interact directly with the hardware and bypass the operating system. On x86 CPUs, for example, there are three such instructions, which involve reading CPU counters. Non-deterministic hardware instructions can be recorded by simply trapping them when they occur.

While trapping the non-deterministic machine instructions incurs overhead, these instructions typically occur infrequently. Thus, standard binary instrumentation techniques can be used to optimize performance. The hw_inst event, as shown in Table 1, is used to record non-deterministic machine instructions. The payload of a non-deterministic hardware instruction event is the type and the execution results of the instruction.

In a system running the Linux operating system, for example, when the RDTSC instruction occurs, a hw_inst event is recorded with the payload of the RDTSC instruction opcode and the 64-bit value of the timestamp counter. During replay, the recorded result is returned instead of executing the instruction.

System calls are the predominant form for processes 109 to interact with their execution environment. System call interposition is used to record and replay the execution of system calls. The processing required before and after system call execution depends on the type of system call and whether it is being recorded or replayed.

During recording, each system call is always allowed to execute and the return value associated with the call is recorded such that the same value can be returned on replay. Recording of the return value is accomplished, for example, by appending the syscall_ret event (Table 1) to the log queue of the calling process after the system call executes.

Beyond dealing with the return values, system calls recording may be classified into three categories: recording process creation/termination system calls, recording system calls that return data, and recording system calls for accessing shared resources.

For system calls that create and terminate processes, such as fork, clone, and exit in a Linux-based system, for instance, additional processing is made to set up a log queue for and to arrange to monitor the execution of a new process when it is created, or perform proper cleanup as an existing process exits, or is terminated.

For system calls that transfer non-deterministic or external data from kernel space to user-space, also referred to as application-space, the data is recorded and saved to the log queue of the calling process using the copy_data event (Table 1), such that the same data can be provided on replay.

FIG. 4A is an illustrative chart showing the recording and replaying of a system call in a Linux-based system that transfers non-deterministic data from kernel space to application space in accordance with some embodiments of the disclosed subject matter. Referring to FIG. 4A, the diagram shows a recording of gettimeofday system call that transfers non-deterministic data (e.g., time of day) from kernel space to application space. To record the non-deterministic data, the system call is invoked with an in-kernel buffer (KTV).

When the system call returns, the return value and the data (time of day) are recorded and appended to the log queue of the calling process. The data is then copied to a buffer in the application space (utv) and the system call returns.

All external input data, including network inputs and data read from special devices, such as /dev/urandom in a Linux-based system, for instance, is delivered through system calls as well. Recording of system calls that transfer external input data from kernel space to application space can be handled similarly.

Data from application space does not need to be recorded because such data is always deterministic on replay. The data resides in the address space of a replayed process and is thus controlled by the replayed process. An exception is if the data is from a buffer that corresponds to mapped input/output (I/O) memory, in which case the contents are logged using the copy_data event.

Similarly, data from file descriptors that refer to the file system or to objects such as pipes is not recorded, for the state and contents of such system resources during replay are controlled by the replaying process and thus are deterministic.

For system calls that access shared resources whose state may be modified, the order in which the system calls occur is recorded such that the system calls can be deterministically replayed. The order in which any two related system calls are invoked is recorded, wherein the outcome of one system call depends on the execution of the other. For instance, a write followed by a read on a pipe are two related system calls, i.e., no data can be read from an empty pipe.

Because related system calls occur from accessing shared resources, access to each such resource is synchronized by converting all locations in which shared resources are accessed into rendezvous points. Rendezvous points are locations at which system call ordering is tracked during recording and enforced during replay.

Rendezvous points are recorded by associating each resource instance with a wait queue and a unique sequence number counter. At any time, exactly one process may be executing inside a given rendezvous point, while others are blocked until the resource is released.

During recording, a process that attempts to access a shared resource will first pass through the corresponding rendezvous point. By doing so, it will increment the sequence number and generate a matching rendezvous event (Table 1). The sequence number in the rendezvous event indicates exact access order for the resource, which can be used to enforce the order during replay.

FIG. 4B is an illustrative chart showing recording and replaying of system calls in a Linux-based system that access shared resources in accordance with some embodiments of the disclosed subject matter. The chart shows an illustrative recording of system calls that write to and read from a buffer using a rendezvous point.

As shown in FIG. 4B, process A must pass a rendezvous point before it can write to the buffer. Process B must also pass the rendezvous point, but with a larger sequence number, thereby preserving their relative order. The sequence numbers and return values are appended to the log queue of the calling processes.

For each rendezvous point, the respective kernel locking primitive that is already in place for the associated resource could be used, but this requires kernel changes. To avoid changing the underlying kernel, a separate mutex is interposed transparently at well-defined kernel entry points.

Exercising synchronization at the system call level requires an additional technique to handle blocking system calls in order to prevent deadlocks. Suppose, for example, that one process reads from a pipe and the other process writes to the pipe and the reading process executes first. The reading process will obtain the pipe mutex and waits for data to appear in the pipe while blocking access to the pipe by other processes. The writing process in turn will try to obtain the pipe mutex but ends up blocked and unable to write any data to the pipe, resulting in a deadlock. To address this problem, it is verified using the select system call whether the file descriptor associated with the pipe is ready, and thus will not block, prior to invoking the read system call.

FIG. 5 is an illustrative list showing pseudo code for blocking system calls in accordance with some embodiments of the disclosed subject matter. Referring to FIG. 5, the select system call is passed a file descriptor associated with a shared resource to determine whether the resource is ready for access by a process. If the resource is not ready for access by the process that obtained the resource mutex, then the process is prevented from invoking a system call for accessing the resource and forced to release the resource mutex.

Several combinations of related system calls have been identified. Table 2 lists categories of related system calls with the respective resources and rendezvous points.

TABLE 2

List of rendezvous points categories

| System call category | Rendezvous resource |
| --- | --- |
| actions on globals | (pseudo) global resource |
| actions on open file objects | inode of the file |
| actions on IPC objects | IPC objects |
| read/write shared mapped files | memory page |
| actions on pathnames | file system mount point |
| create file descriptors | file descriptors table |
| modify memory layout | memory descriptor |
| actions on process properties | process descriptor |

Referring to Table 2, a special global resource instance associated with a rendezvous point is included. The resource may be used for two purposes, for example. First, the special global resource instance can be used for system calls that access properties global to the execution environment, such as syslog, sethostname, and settimeofday. When such system calls are invoked during recording, the values for these properties recorded in the resource instances are returned, instead of invoking the respective system calls. Preserving the orders in which the system calls are invoked ensures that the settings are accurate should the system go into live execution at any point.

Second, the special global resource instance can be used for system calls for which multiple attempts to allocate a resource can be mapped to the same resource instance. Resources for which this can occur are inodes, IPC objects, and mounting points for disks or other devices. For example, a file can be opened multiple times referring to the same inode, and it is important to know the order in which the open system calls occurred.

For system calls that operate on open file objects, such as files, devices, network sockets, and pipes, inodes are utilized as rendezvous points. Inodes are referenced by a variety of file-related system calls, such as open, read, write, close, lseek, and fcntl. Because most file-related operations are re-executed during replay, this ensures that they occur in the proper order for a given inode.

Similarly, for system calls that operate on IPC objects, such as message queues, semaphores, and shared memory, the respective IPC resources are used as rendezvous points. For system calls that read from and write to shared memory files, for instance, the underlying memory pages are used as rendezvous points.

For system calls that operate on file system pathnames, such as open, unlink, create, fifo, access, stat, chmod, chown, execve, and chroot, the order in which they are invoked must be tracked for correct replays. This is because they can modify the state of the file system by creating, deleting and modifying attributes of files. The file system mount points are used as rendezvous points to track the calling order, but the mount points are used at the virtual file system (VFS) layer instead of the system call layer.

The order in which system calls that act on pathnames view and modify the file system state can be derived from the order of pathname lookup progress at the virtual file system layer. The VFS performs pathname traversal one component at a time and holds the lock of a parent directory while accessing or modifying its contents. Therefore, it suffices to record the order of pathname traversal to reproduce the order of system calls that act on pathnames.

Recording the order of pathname traversal is achieved by interposing on the VFS pathname traversal to increment the sequence number for the rendezvous point associated with the mount point. The sequence number is incremented only for the system calls that perform operations affecting the existence or access permissions of files.

In the presence of threads, rendezvous points are used to track system calls that create file descriptor, modify memory layout, and modify process properties or credentials, because those per process resources are shared among threads. For system calls that create file descriptors, such as open, pipe, and fifo, the calling process's file descriptor table is used as the rendezvous point. The underlying inode cannot be relied on for synchronization because it does not exist yet.

For system calls that modify the memory layout, such as brk, mmap, munmap, and mprotect, the calling process's memory descriptor is used as the rendezvous point. For system calls that modify process properties and credentials, such as setuid, setgid, setpgid, setsid, and setrlimit, the process descriptors are used as the rendezvous point.

The process descriptor is also used as the rendezvous point to ensure correct ordering among system calls that modify the file system view of a process, such as chroot and chdir. System calls that are re-executed on replay and implicitly rely on process properties and credentials also use the rendezvous point associated with the process descriptor. For examples, open and access system calls use a process's user and group identifiers to decide if it has sufficient permissions to operate on a file, kill system call uses capabilities to permit a signal, and setpgid system call uses a process's session identifier.

Executing a system call may result in recording multiple rendezvous events. The categories of rendezvous points listed in Table 2 are not mutually exclusive. For example, running open system call on a file already opened by another process will result in a rendezvous event for the global resources, for the process descriptor, and for the inode resource.

System calls that belong to each process are replayed independently from other processes during replay until a rendezvous point is reached. Once a rendezvous point is reached, only the process with matching (smallest) sequence number is permitted to enter the rendezvous point and execute. The processes with higher sequence numbers will be blocked while waiting for their turn. Rendezvous points are thus exploited to preserve the partial ordering of related system calls during replay.

The degree to which the invocation of replayed system calls resemble the original invocation varies according to the specific action of the system calls. When providing the return value of a system call on replay, the return value from the corresponding syscall_ret event in the log queue of the calling process is used. The return value from executing the actual system call is not returned, for such value may differ and result in the replay diverging from the recorded execution. Beyond dealing with the return value, system calls processing during replay can be classified into seven different categories.

For system calls that only return values and do not modify system state, such as getpid, getppid, getuid, getgid, getegid, getpgrp, and getpgid, the return value from the corresponding syscall_ret event is returned and the actual system call on the underlying system does not need to be executed.

For system calls that transfer data from kernel to user-space but do not modify system state, replay is done by returning the data logged in the corresponding copy_data event. The actual system call on the underlying system does not need to be executed. These system calls typically read timing or system information and include uname, getrusage, getitimer, gettimeofday, time, clock_gettime, clock_getres, nanosleep, times, and sysinfo.

For system calls that modify system state, such as brk and setsid, replay typically requires executing the actual system calls. Most of such system calls are replayed by directly executing the actual system calls during replay. By executing the actual system calls, it can be guaranteed that the state of all the resources that belong to the respective session is correct at all times, and the session may safely stop replaying, go live, and proceed to execute normally. If a system call execution that was successful in the original application fails during replay, the replay is aborted.

For system calls that create and terminate processes, such as fork, clone, and exit, additional bookkeeping is required during replay. When a new process is created, a log queue is created and control for executing the process is arranged, and the proper cleanup is performed when the process exits. When creating processes during replay, the underlying virtual execution environment is relied upon to provide a method to select predetermined virtual process identifiers so that processes can reclaim the same set of virtual resource identifiers they had used during recording. The same is true for other system calls that allocate resources with identifiers assigned by the kernel, such as IPC identifiers.

Replaying system calls that accept wild-star (catch-all) arguments, such as wait and mmap, is challenging because the kernel can select one outcome among multiple possibilities at random. For example, when mapping a new memory region without specifying a target address, the kernel is free to select any suitable address. Likewise, when collecting zombies without specifying a target process, the kernel may choose any zombie process if there is more than one zombie. To rectify this, the offending argument is manipulated to ensure deterministic operation. More specifically, because the outcome of the system call (e.g., which address or process was selected) is already known, the known outcome is substituted for the wild-star argument.

Some system calls that affect the kernel space have special effect that stems from interacting with entities external to the recorded session. Such external factors are not part of the replayed session and thus they become meaningless during replay. Examples are read from /dev/random device, connect through the network, and reading data from, or writing to, the network. These system calls are not executed. Instead, they are emulated. To allow the replayed session to transition to real execution at any time, however, the corresponding external resource is allocated and kept in a ready state so that the resource can be accessed upon entering a live execution. System calls that are related to network sockets, such as socket, bind, listen, and close, are examples. The connect system call attempts to connect to an external socket and hence is not executed during replay. The accept system call is also not executed, but instead its effect is simulated by creating a brand new socket. Thus, the sockets that were connected during recording become disconnected and closed during replay, reflecting a lost connection. If the application thereafter goes live, it will perceive a network disconnect on the next access attempt.

Replaying signals is challenging because of their asynchronous nature. For example, signals in Linux are delivered in two stages. First, the sender process sends a signal to a target process, which is marked as having a signal pending. Second, the target process detects the pending signal and subsequently handles it. If the target process is executing in user mode when signals are received, an inter-processor interrupt will force it into kernel mode where it will detect the pending signals.

Replaying this behavior requires interrupting the target process at the exact same instruction as during its original execution. This is difficult because the interrupt could have occurred at any time during execution. If the target process executes in kernel mode when the signal arrives, replay must preserve the order among multiple signals, and ensure that they have the same effect on system calls in progress at that time.

This challenge is resolved herein by using sync points. Sync points are locations in a recorded process's execution at which the process enters kernel mode due to its own actions, such as invoking a system call, accessing a memory address that causes a page fault, or a trap caused due to an attempted division by zero. The location of a sync point in a process's instruction stream can be identified by the instruction that caused the process to enter kernel mode, and is thus deterministic.

During recording, the delivery of an asynchronous signal to a target process is deferred until the process is at a sync point, thereby making it easy to determine the exact instruction at which the signal is delivered. If the target process is executing in user mode when a signal is generated, the signal is queued and its delivery is deferred until the process is at a sync point, such as a system call, and therefore synchronously enters the kernel. This effectively transforms the asynchronous nature of signals into synchronous behavior.

When a process enters kernel mode, it first checks whether it has any pending, deferred signals and, if so, such signals are delivered to the process and a corresponding signal_receive event is logged for each delivered signal. The process is then forced to return to user mode to handle the signals. In the case of a sync point due to a system call, it will also rewind the instruction pointer so that the process will re-issue the system call. If the target process is in kernel mode when a signal is generated, on the other hand, it is already at a sync point and thus the signal is delivered immediately.

Deferring signals incur a performance penalty by increasing the latency of signal delivery and handling. In practice, however, sync points occur frequently enough in an executing application that such performance overhead tends to be low.

Some signals, such as SIGSEGV, SIGFPE, and SIGBUS, are synchronous because they are the direct result of an action of a target process. For example, SIGBUS signal is generated and sent to the target process when it causes a bus error. These signals occur while the process is in user space, and cannot be deferred for a later time. They by definition already force the target process into kernel mode and can therefore be delivered and handled on the spot. These signals do not need to be logged because they are deterministic.

During replay, a sender process simply skips the system call that generates the signal and proceeds with its execution. Instead, signal delivery is deterministically replayed at the occurrence of sync points in the execution of a receiving process.

When a process enters kernel mode as it reaches a sync point, the next event in its log queue is examined. If it is determined that the subsequent entry in the log queue corresponds to a signal_receive event, the designate signal is delivered to the process. The delivered signals are then handled as soon as the process resumes executing in user space.

Synchronous signals, such as SIGSEGV and SIGBUS, implicitly occur as part of the replay once the condition occurs that had triggered them in the original recording.

One set of signals, SIGSTOP and SIGCONT, is treated differently. A SIGSTOP signal causes a process to stop executing until a companion SIGCONT signal causes it to resume its execution. Unlike other signals, which are replayed by arranging for the target process to receive and handle the desired signals, SIGSTOP and SIGCONT are not resent as it would interfere with the replay. Because replay is performed in the context of the individual process, a stopped process will never check its log queue to look for the corresponding SIGCONT signal. Instead of actually stopping the target process that receives a SIGSTOP, the process is maintained in a stalled state in kernel mode while the events remaining in its log queue are examined and handled until a corresponding SIGCONT signal is encountered. Once the SIGCONT is encountered, the process is allowed to resume its execution. When a session that contains a stalled process prepares to go live, the skipped SIGSTOP is sent to the stalled process to force it into the proper kernel state.

Much like system calls that do not modify the system state and only return value, signals are a form of forward dependency that requires additional care when allowing a session to go live. For example, when process 1 (PI) replays sending a signal to process 2 (P2), it skips the system call that generates the signal for P2 and assumes that the signal has been delivered. In the meantime, the signal remains in the log queue of P2 until P2 reaches the matching sync point and consumes the corresponding signal_receive event. Before transitioning from replay to live execution, therefore, the replay of P2 must continue until it handles the signal, or else the signal will be lost forever with the flushing of the log queues.

FIG. 6A is an illustrative chart showing recording and replaying of a non-deterministic signal in accordance with some embodiments of the disclosed subject matter. Referring to FIG. 6A, in both record and replay, the sender process skips the system call that causes a signal (sig) for the target process B (B) and just notifies B of the pending signal. When B finally hits a sync point, it detects the pending signal and sends the signal to itself while logging the signal_received event.

In the unlikely event that a signal delivery is deferred too long due to an absence of additional sync points, a more heavyweight mechanism is employed for recording and replaying in accordance with some embodiments of the disclosed subject matter. The amount of time for which a signal has been deferred is kept track of and the more heavyweight mechanism is used when the amount of deferred time exceeds a predefined threshold.

If the amount of deferred time exceeds the threshold, for example, the target process receives a reserved signal that forces the process into kernel mode. Before the process is forced into kernel mode, however, a signature of the target process is created. In one embodiment, the signature of the process includes the context of the process's registers and variable memory pages.

Because no sync points have occurred, it can be ensured that the target process also does not have any interactions with other processes since its last sync point and until it is finally forced into kernel mode. Therefore, it can be ensured that no non-deterministic interactions are missed by forcing the process into kernel mode. Forcing the target process into kernel mode can thus be thought of as resetting the recording, and is logged as async_reset event. By forcing the target process into kernel mode, a new sync point is created in effect. The deferred, overdue pending signal can then be delivered and its location with respect to the new sync point can be determined.

An issue during replay is knowing when the target process should consume the async_reset event. This issue is resolved by setting a breakpoint at the instruction specified by the saved value of the program counter, starting at the last event in the log prior to the async_reset event. The target process will generate an exception each time that it reaches the instruction pointed to by the saved program counter, prompting a comparison of its current use space context (e.g., registers file and contents of suitable memory pages) with the saved signature of the async_reset event.

Consequently, the async_reset event occurs when this data at the replayed process matches the saved signature of the event. Once that happens, the breakpoints are removed and normal replay resumes. The signature-based record and replay can incur overhead, but the overhead can be reduced by only recording differences in signatures.

Replaying shared memory interleavings is critical for deterministic replay, especially on multiprocessor machines. Memory sharing happens either explicitly when multiple processes share a common shared mapping, or implicitly when the entire address space is shared, for instance, by multiple threads.

The main tool to monitor and control memory access in software is the page protection mechanism. Replaying the order of memory access efficiently in software is fundamentally difficult since one process may access shared memory asynchronously with, and at any arbitrary location within, another process's execution. This difficulty is addressed by using page ownership management in accordance with some embodiments of the disclosed subject matter. Because of spatial and temporal locality, for example, a process typically accesses multiple locations on a page during a given time interval.

A page can be treated like a private memory for a process during a time interval if it can be guaranteed that no other process is allowed to modify that page during that time interval, and in turn there is no need to track memory accesses since there are no non-deterministic shared memory interleavings. To work correctly, however, this scheme requires a protocol to manage page ownership transitions and a method to ensure that such transitions occur at precisely the same location in the execution during both record and replay. A concurrent read, exclusive write (CREW) protocol is employed in some embodiments for proper page ownership transition operations.

A state field of a page is used to indicate whether it is un-owned (public), owned exclusively for read and write (owned_write) or shared for read by one or more processes (shared_read). A process that owns a page exclusively has its page table entry (PTE) set to read-and-write. A process that shares a page has the PTE set to read-only. Otherwise the respective PTE will remain invalid to prevent access. A page that is shared for reading continuously track its list of readers, and an exclusively owned page tracks its writes (owners).

Transitions between the page states are as follows. A public page becomes shared_read or owned_write on the first read or write access, respectively. An owned_write page turns into shared_read when another process attempts to read from it: the owner process will give up exclusive access and downgrade its PTE to be read-only. An owned_write page can also change owner, in which case the old owner will give it up and invalidate its own PTE, while the new owner will adjust its PTE accordingly. A shared_read page becomes owned_write when the page is accessed for writing. Finally, a page becomes public when all processes that have right to access is terminated.

A challenge is that transfer of page ownership—transitions that force a process to surrender access rights for a given page—takes place asynchronously due to another process's memory access. Nevertheless such events must occur at exactly the same point in the execution during replay. The key is to allow memory events to only take place when they can be tracked and replayed later.

Akin to how record and replay of signals are handled, asynchronous memory events are converted into synchronous ones by deferring their realization until the owner process reaches a sync point.

Page faults due to the memory interleaving under the CREW protocol contribute significantly to the pool of sync points in addition to system calls. When a process attempts to access an owned page it notifies the owner process, and—unlike with signals—blocks until it is granted access to the page. Owner processes, on the other hand, check at every sync point whether they have a pending request, and if necessary give up ownership. At that point the requesting process is unblocked, the CREW protocol updates occur, and the precise location in the owner's instruction stream, at which another process interleaved its memory access, can be logged.

When an owner of a page executes a system call and blocks, it cannot check for any new pending requests for its page. This can cause long delays in transferring ownership, and may even lead to a deadlock if, for example, the owner blocks on a read from a pipe, and the other process stalls on a memory access while attempting to write into the same pipe. To address this, an owner process that enters a system call is tagged as a weak-owner until the system call completes. This flag indicates that other processes may promptly revoke ownership of any of the pages that it holds. The page table entries (PTEs) of the requesting processes and the owner process are updated promptly to reflect these actions.

Pages that belong to a shared mapped file can be accessed either via direct memory references, or through read and write. By definition, access via the system call will bypass the page protection mechanism that enforces the CREW protocol. To prevent deadlock and ensure consistency with CREW, a rendezvous point is associated with the mapped pages. This guarantees that the two methods to access the shared mapped pages are mutually exclusive, and that their order is preserved between record and replay.

The page ownership management mechanism requires updating PTEs. To support threads without incurring high overhead due to translation lookaside buffer (TLB) invalidations, shadow page tables are used to track thread shared memory accesses. All threads may share a common page table for reference, but each thread uses its own private shadow page table. The reference page table maintains the current state of all pages.

When a thread causes a page fault, the corresponding entry in the reference page table is consulted and the PTE to the thread's shadow table is copied. The reference page table is explicitly updated when any of the threads modifies the process's address space layout, e.g. through mmap, munmap and mprotect system calls. It is also adjusted implicitly when copy-on-write (COW) is established due to a fork, or when a COW breaks.

For a single thread, the shadow page table directly mirrors the reference page table. Upon transition from single- to multi-threads, all the PTEs in the shadow page table of the older thread are cleared. Access to the reference page table is protected by a lock to prevent races.

Tracking of shared memory interactions is predicated on two assumptions, for example. First, sync points occur frequently enough in real applications that they can be used for transferring page ownership quickly as needed. Second, real applications do not typically use user-space-only spin-locks or related mechanisms. For example, consider a thread that reads from a memory location in a busy loop until it finds a positive value, and another thread that intends to write a positive value to that location. Assume that the former thread becomes the owner of the page. The threads are now deadlocked, since the second thread waits for the first thread to give up the ownership for the page, and the first thread waits for the second one to change the value in the memory.

While the likelihood of the deadlock scenario is not common in real applications, a solution similar to that used for recording signals in the absence of sync points is provided in accordance with some embodiments of the disclosed subject matter. During recording, the amount of time for which a page fault has been deferred is kept track of and a different mechanism kicks in when the deferred time exceeds a predefined threshold. At that point, a reserved signal is sent to the owner process to force it into kernel mode.

Prior to forcing the owner process into kernel mode, however, a signature of the owner process consisting of its processor context and its memory pages, is created. The signature provides a snapshot of the current state of the owner process that can be used to allow deterministic replay. The page is released from the owner after the owner is forced into kernel mode and the tracking of all shared memory accesses resumes.

FIG. 6B is an illustrative chart showing recording and replaying of a non-deterministic shared memory interleavings in accordance with some embodiments of the disclosed subject matter. Referring to FIG. 6B, process A (A) attempts to write to a page owned for writing by process B (B), notifies B that it wants access to the page, and stalls until the page becomes available. When B reaches a sync point, it sees the request, downgrades the ownership (and PTE) to read-only, logs a memory event, and wakes up A. A then adjusts its own PTE and can now resume execution.

To transition a session from replay mode to live execution, the presence of two conditions is confirmed. First, the state of all resources in the session must not be newer than what is dictated by the log at that point in time. This is enforced by replaying all the system calls that create, modify or destroy resources, in order. Second, the state of these resources must not be older than what processes in the session had perceived so far. While reading the state of a resource often involves the reader process passing through the respective rendezvous point, this is not always the case. System calls that do not modify system state and only return values will do so immediately, bypassing the rendezvous point. It is possible that a process observes a future state of a resource, before that resource is actually modified to reach that state.

During recording, for example, suppose that process 1 (P1) modifies its process group identification (PGID) by invoking setpgrp system call, followed by process 2 (P2) querying the PGID of P1 by invoking getpgrp system call. Suppose also that during replay P2 executes and obtains the PGID before P1 can modify it. If the session goes live at that point, the state viewed by both processes would be inconsistent. Similar inconsistencies can emerge between different threads that modify and observe their shared state, or even via a covert channel such as the proc file system that exposes information about processes.

Therefore, before permitting the processes or threads to go live, a proper consistent view of the session among all processes is established, by identifying such forward dependencies into the future and extending the replay as necessary until all inconsistencies are reconciled. In the previous example, for instance, P1 is steered to carry on replay until it eventually executes the matching setpgrp system call. Then, and only then, the session is ready to safely go live.

Once the two requisite conditions are met, a final step is performed before the session is allowed to go live by flushing the logs, freeing the resources taken by existing rendezvous points, and removing the replaying flag from all the processes in the session.

The following examples are set forth to aid in the understanding of the disclosed subject matter, and should not be construed to limit in any way the scope of the disclosed subject matter as recited in the claims which follow thereafter.

A prototype implemented as a Linux kernel module and associated user-level tools was utilized to record and replay real applications on commercially available, unmodified multiprocessors and operating systems. A system comprising an IBM HS20 eServer BladeCenter, each blade with dual 3.06 GHz Intel Xeon CPUs with hyperthreading, 2.5 GB RAM, a 40 GB local disk, and a Gigabit Ethernet switch for interconnection, was used for experimental running of the prototype. Each blade was running the Debian 3.1 distribution and the Linux 2.6.11.12 kernel and appeared as a 4-CPU multiprocessor to the operating system.

For application workloads that required clients and a server, the clients were run on one blade and the server was run on another blade. A wide range of real applications, including all of the applications listed in Table 3, were recorded and replayed. The list includes (1) server applications such as Apache in multi-process apache-p and multi-threaded apache-t configurations, MySQL mysql, and an OpenSSH server ssh-s, (2) utility programs such as SSH clients ssh-c, make make, untar untar, compression programs such as gzip and lzma, and a vi editor editor, and (3) graphical desktop applications such as Firefox firefox, Acrobat Reader acroread, MPlayer mplayer, and OpenOffice openoffice.

TABLE 3

Application Scenarios

| Name | Description | Benchmark | Time |
| --- | --- | --- | --- |
| apache-p | Apache 2.0.54, 8 processes, prefork | httperf 0.8 (rate = 1500, num-calls = 20) | 189 s |
| apache-t | Apache 2.054, 50 threads, worker | httperf 0.8 (rate = 1500, num-calls = 20) | 187 s |
| mysql | MySQL 5.0.60 database server | sql-bench | 184 s |
| ssh-s | OpenSSH 5.1pl (server) | 50 SSH sessions (10 concurrent), each emulates user typing 5K text file | 53 s |
| ssh-c | OpenSSH 5.1pl (client) | 50 SSH sessions (10 concurrent), each emulates user typing 5K text file | 53 s |
| make | parallel compilation of Linux kernel | make -J10 of the Linux kernel | 101 s |
| untar | untar of Linux 2.6.11.12 source tree | gumzip linux-2.6.11.12.tar.gz\|tar xf- | 2.8 s |
| urandom | reading from/dev/urandom | dd=/dev/random bs = 1k count = 10000\|lmna >/dev/null | 2.61 s |
| editor | vim 7.1 text editor | vim -S vi.script to append hello world 1000000 times | 12.4 s |
| firefox | Firefox 3.0.6 web browser in VNC | sunSpider 0.9 JavaScript benchmark | 120 s |
| acroread | Adobe Acrobat Reader 8.1.3 | open 190 KB PDF, close and exit | 2.8 s |
| mplayer | Mplayer 1.0rc2 movie player in VNC | play 10 MB 1280 × 720 HDTV video at 24 frames/s | 30.8 s |
| open-office | OpenOffice 3.0.1 office suim in VNC | Jungletest r27 (2009-03-08) open document, export, close, and exit | 4.9 s |

To run the graphical applications on the blade which lacks a monitor, VNC (TightVNC Server 1.3.9) was used to provide a virtual desktop. The performance of the prototype was measured using the benchmark workloads listed in Table 3. Applications were all run with their default configurations and workloads were selected to stress the system to provide a conservative measure of performance.

For example, firefox ran the widely-used SunSpider benchmark designed to measure real-world web browser JavaScript performance. Also included were benchmarks that emulate multiple interactive users such as ssh-s and ssh-c, which open multiple concurrent SSH sessions, each having an emulated user input text into a vi editor at world-record typing speed to create a 5 KB file.

Focus was placed on quantifying the performance overhead and storage requirements of running applications in terms of the cost of continuously recording the execution. The overhead of the virtual execution environment was also measured and found to be quite small.

Figure 7:
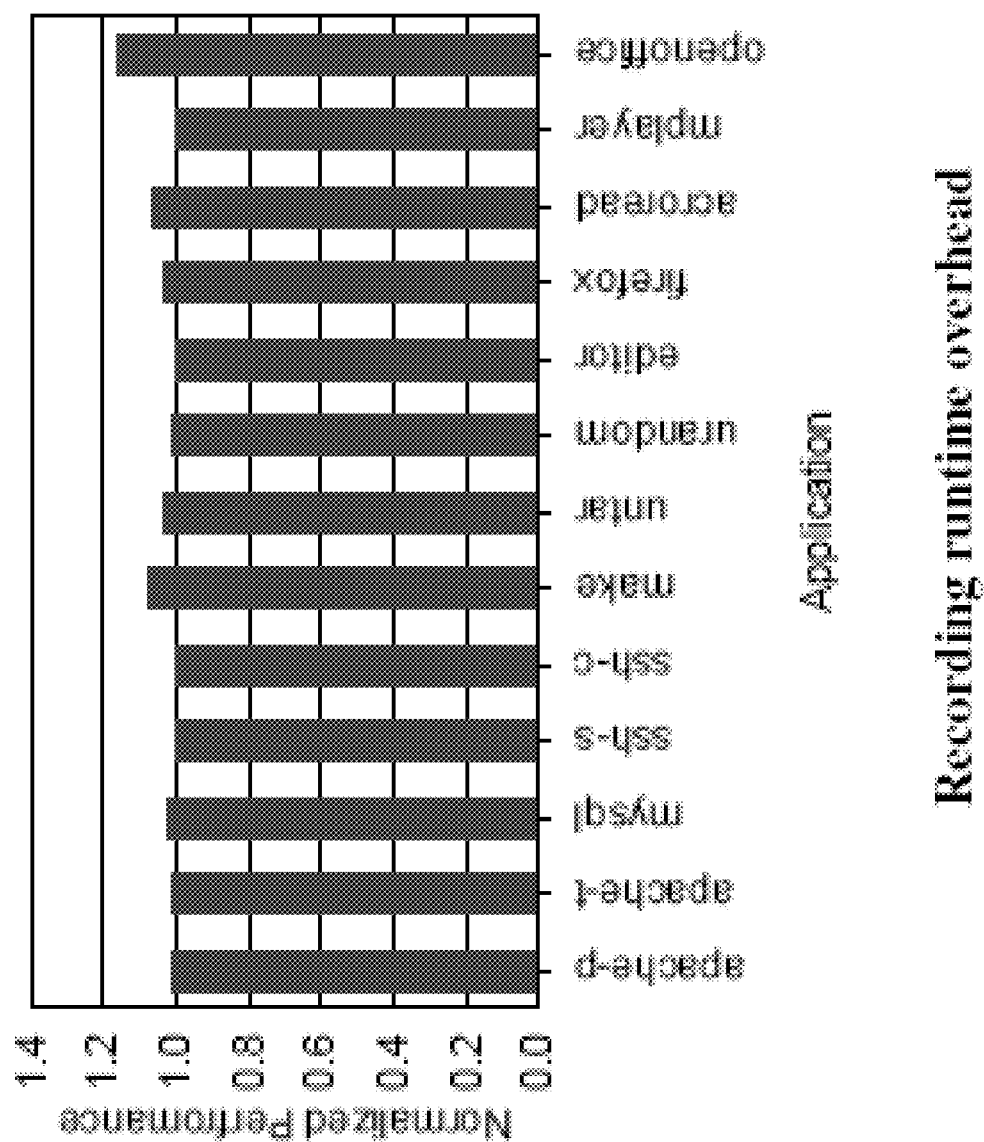
FIG. 7 is a graph showing the performance overhead of recording real application workloads in accordance with some embodiments of the disclosed subject matter.

FIG. 7 is a graph showing the performance overhead of recording the real application workloads in accordance with some embodiments of the disclosed subject matter. Referring to FIG. 7, performance is measured as completion time in all cases except for apache-p and apache-t which report performance in completed requests per second, and mplayer which reports the video frames dropped during playback. Results are shown normalized to native execution without recording. Recording overhead was under 2.5% for server applications and under 7% for all desktop applications except for OpenOffice, which was 15%. For all desktop applications, there was no user noticeable degradation in interactive performance.

Figure 8:
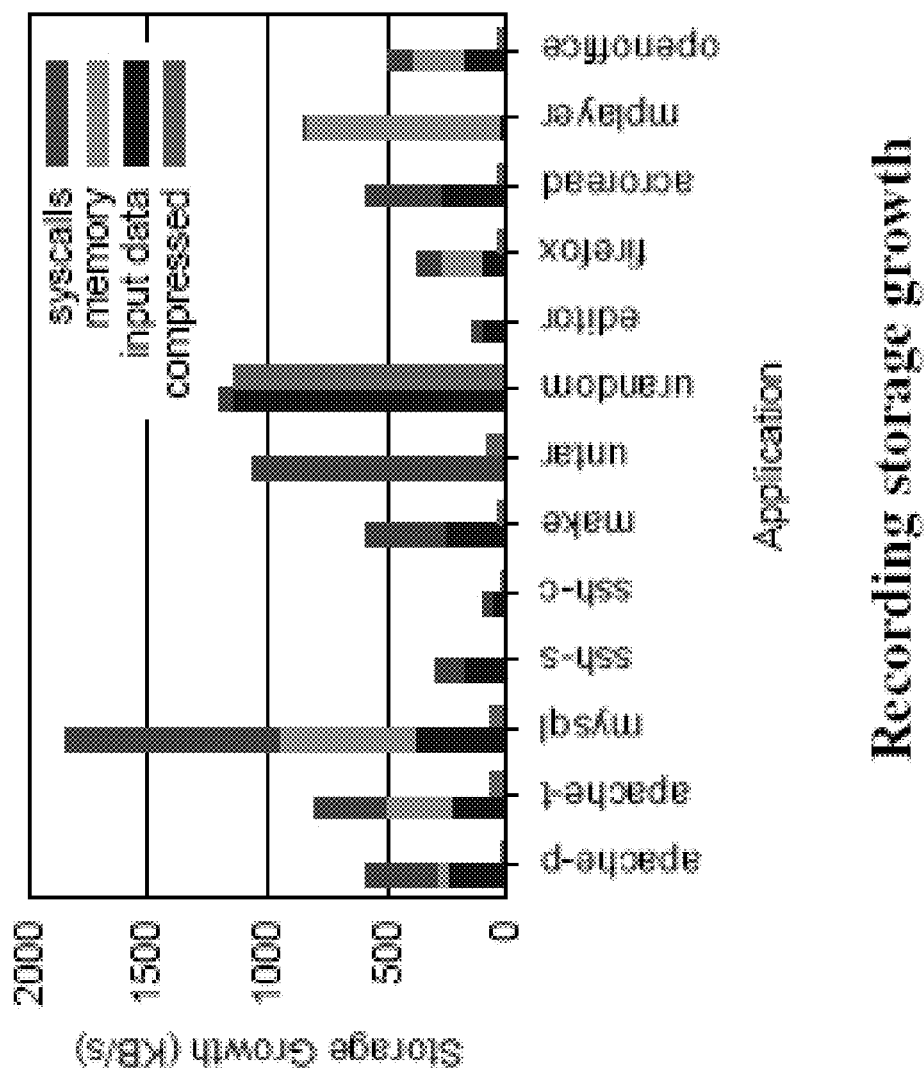
FIG. 8 is a graph showing the storage growth rate of recording the execution of real applications in accordance with some embodiments of the disclosed subject matter.

FIG. 8 is a graph showing the storage growth rate of recording the execution of real applications. Referring to FIG. 8, storage requirements are decomposed into memory-related events (memory), nondeterministic input data returned by system calls (input data), and other data which is primarily system call return values and rendezvous points (syscalls). The storage growth rates ranged from 100 KB/s for ssh-c to almost 1.9 MB/s for mysql. When compressed using lzma, storage growth rates dropped to between 1 to 90 KB/s for all scenarios except urandom, whose storage growth rate remained a bit over 1.1 MB/s. Most of the log of urandom was due to input of random data, which does not compress well.

Figure 9:
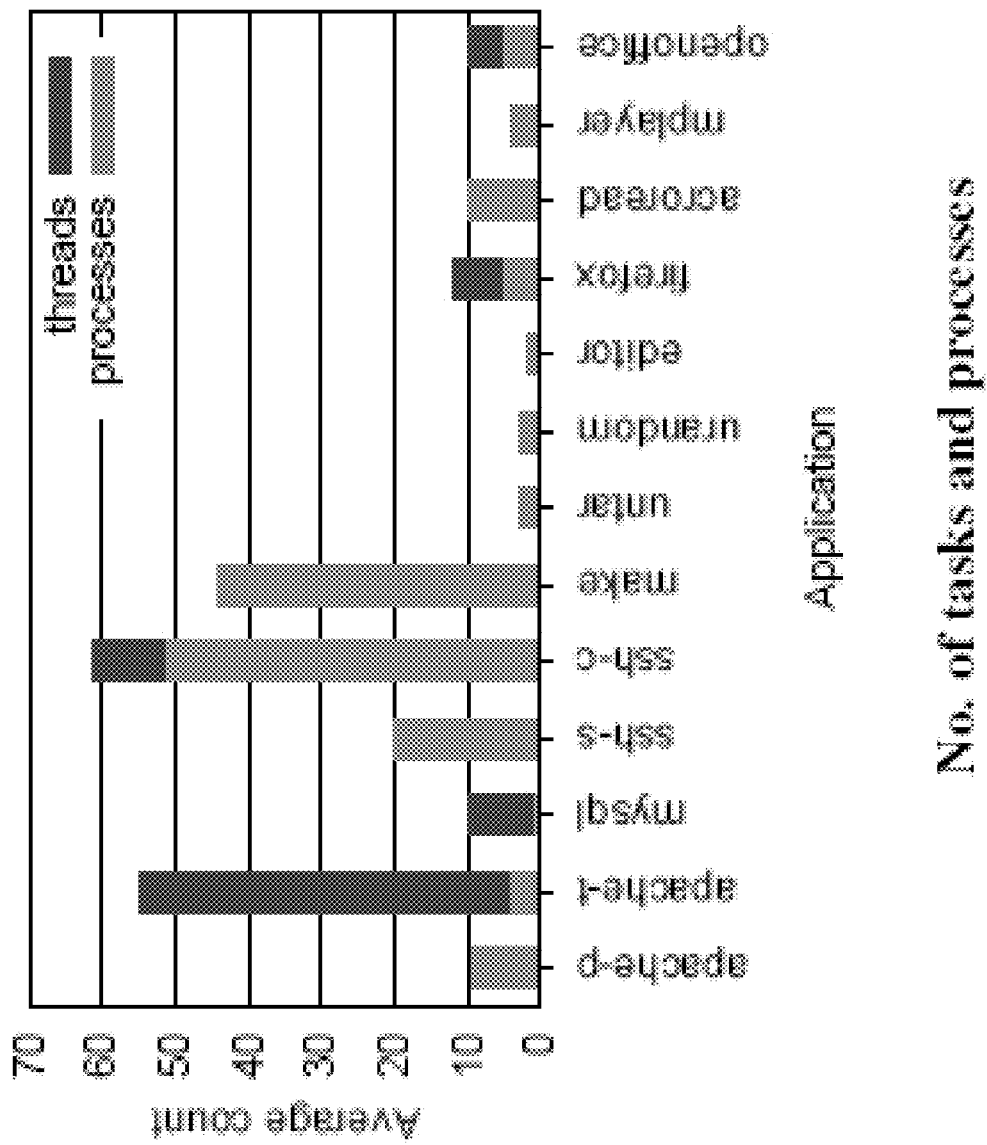
FIG. 9 is a graph showing the average number of processes and threads running for real applications in accordance with some embodiments of the disclosed subject matter.

FIG. 9 is a graph showing the average number of processes and threads running for each application scenario. The sum of the two is the average number of total Linux tasks running. Referring to FIG. 9, all workloads except editor consisted of multiple processes or threads, demonstrating the ability of the prototype to record and replay real multi-process and multi-threaded application workloads. Five of the scenarios used threads: apache-t, mysql, ssh-c, firefox, and openoffice. For all of these scenarios except ssh-c, this correlates with the majority of the log storage consisting of memory events, as shown in FIG. 8. The threads in ssh-c are part of a package used in the benchmark to manage concurrent sessions. They involve very little contention over shared memory, and therefore do not contribute much to the log size. Conversely, apache-p showed mild shared memory activity despite being a multi-process application rather than multi-threaded.

Figure 10:
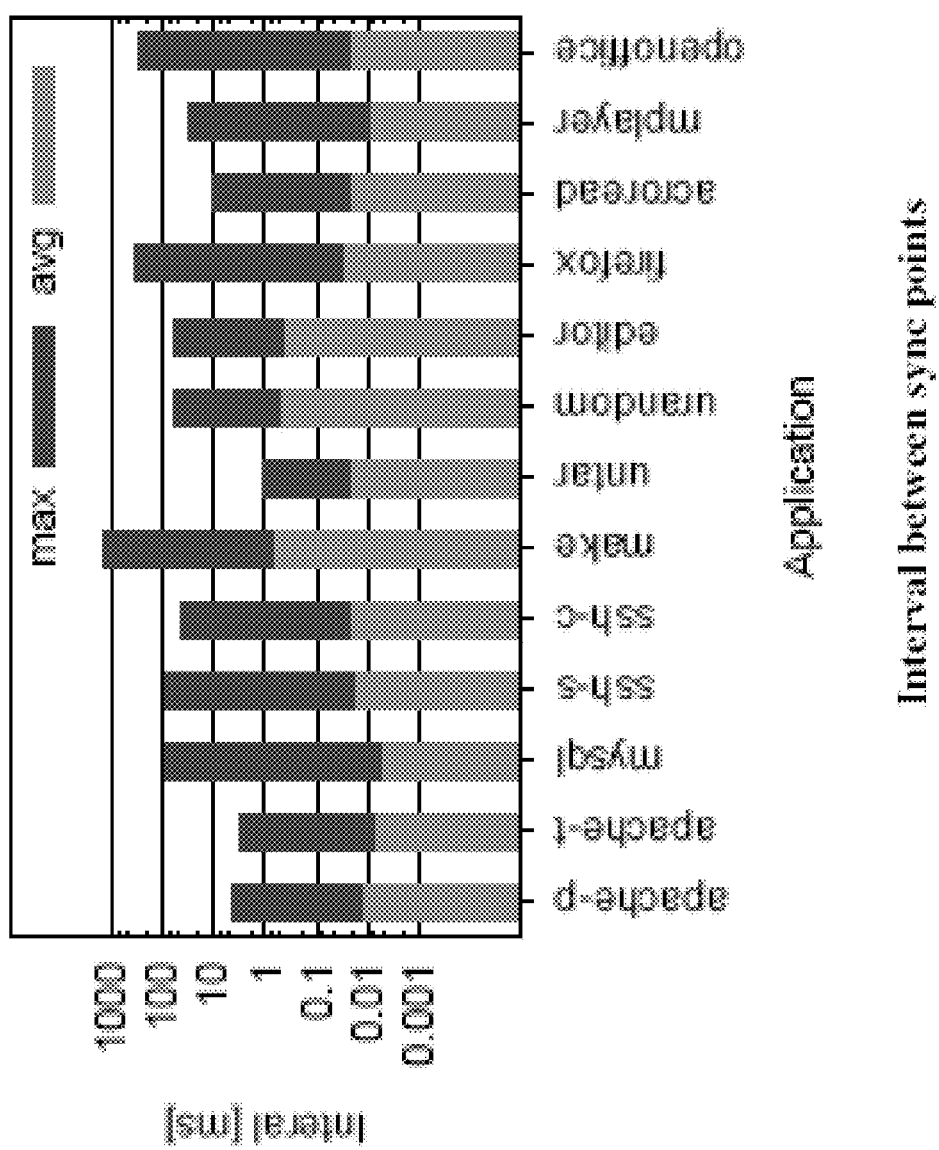
FIG. 10 is a graph showing the time interval between consecutive per process sync points for real applications in accordance with some embodiments of the disclosed subject matter.

FIG. 10 is a graph showing the time interval between consecutive per process sync points for each application scenario. Referring to FIG. 10, the average time interval was measured per process then averaged over all processes. It was less than 1 ms for all scenarios. In other words, on average, the handling of an asynchronous event that cannot be handled instantly will be deferred by less than 1 ms. This establishes the empirical grounds for the assumption that sync points can be used to successfully convert asynchronous events to synchronous ones in a timely manner. The maximum time interval between sync points for almost all application workloads was less than 100 ms, which is also not large and similar to the scheduling time quantum in Linux. For two application workloads, firefox, and openoffice, the maximum interval between sync points was roughly 400 ms, but only occurred once and occurred during the startup of each application. Excluding these outliers, the time interval is less than 10 ms if the 99th percentile of the time interval between sync points are computed.

Figure 11:
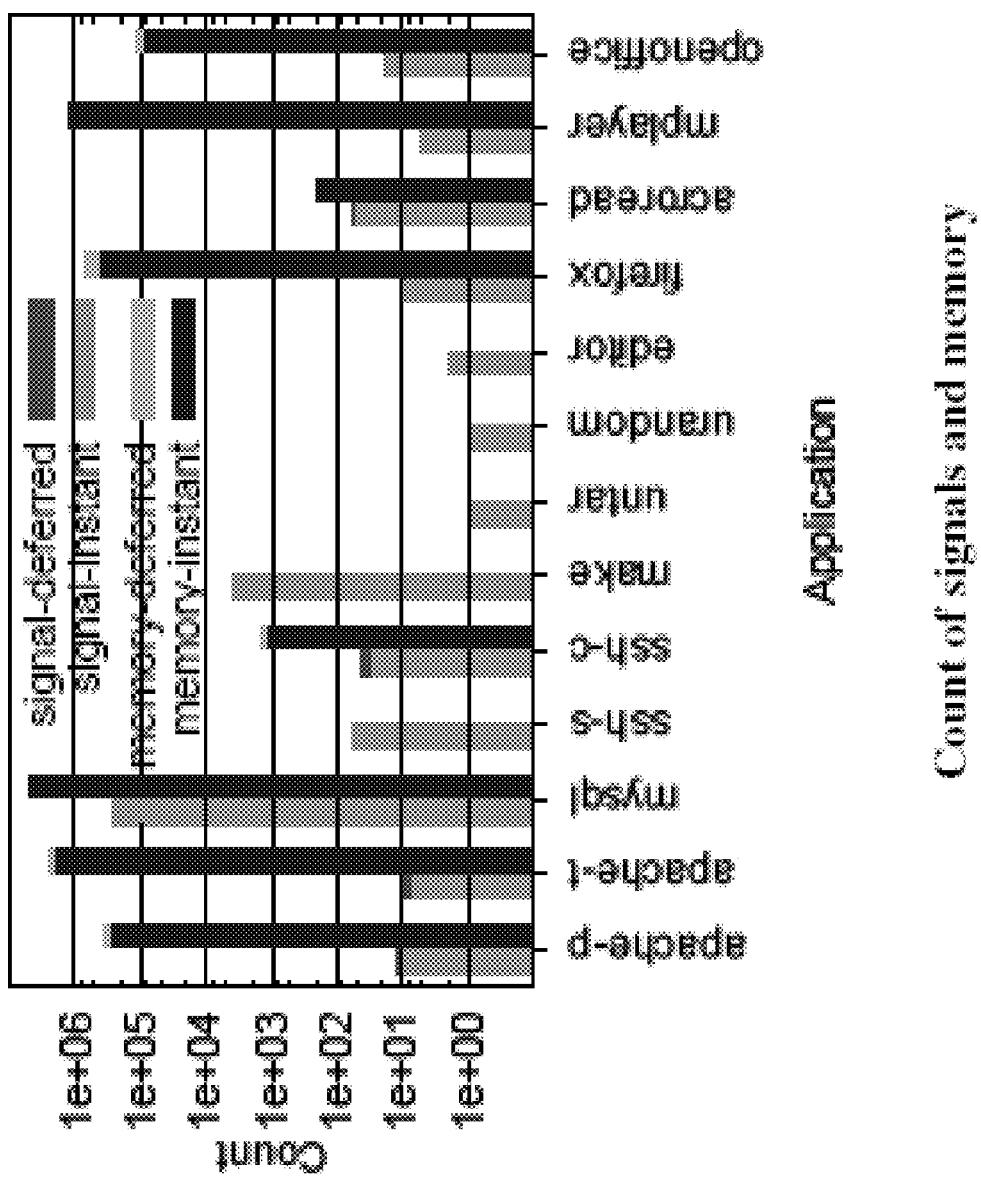
FIG. 11 is a graph showing the total number of non-deterministic signals and shared memory page faults related to a page ownership management mechanism used for real applications in accordance with some embodiments of the disclosed subject matter.

FIG. 11 is a graph showing the total number of signals and shared memory page faults related to the page ownership management mechanism used for each application scenario. Referring to FIG. 11, the total numbers are decomposed into those that are handled instantly versus those that need to be deferred until a sync point is reached. The measurements show that the prototype provides low-overhead execution recording even in the presence of a large number of asynchronous events. Despite the sometimes huge amount of asynchronous events, particularly in threaded applications which were as high as 25,000 events per second, the prototype generated logs that are modest in size. The reason is that nearly all asynchronous events of either type were handled instantly as they arrived, because the process that is the target of these events was already blocked in the kernel at a sync point. Sync points happen frequently enough that the vast majority of asynchronous events could be handled immediately without being deferred.

Figure 12:
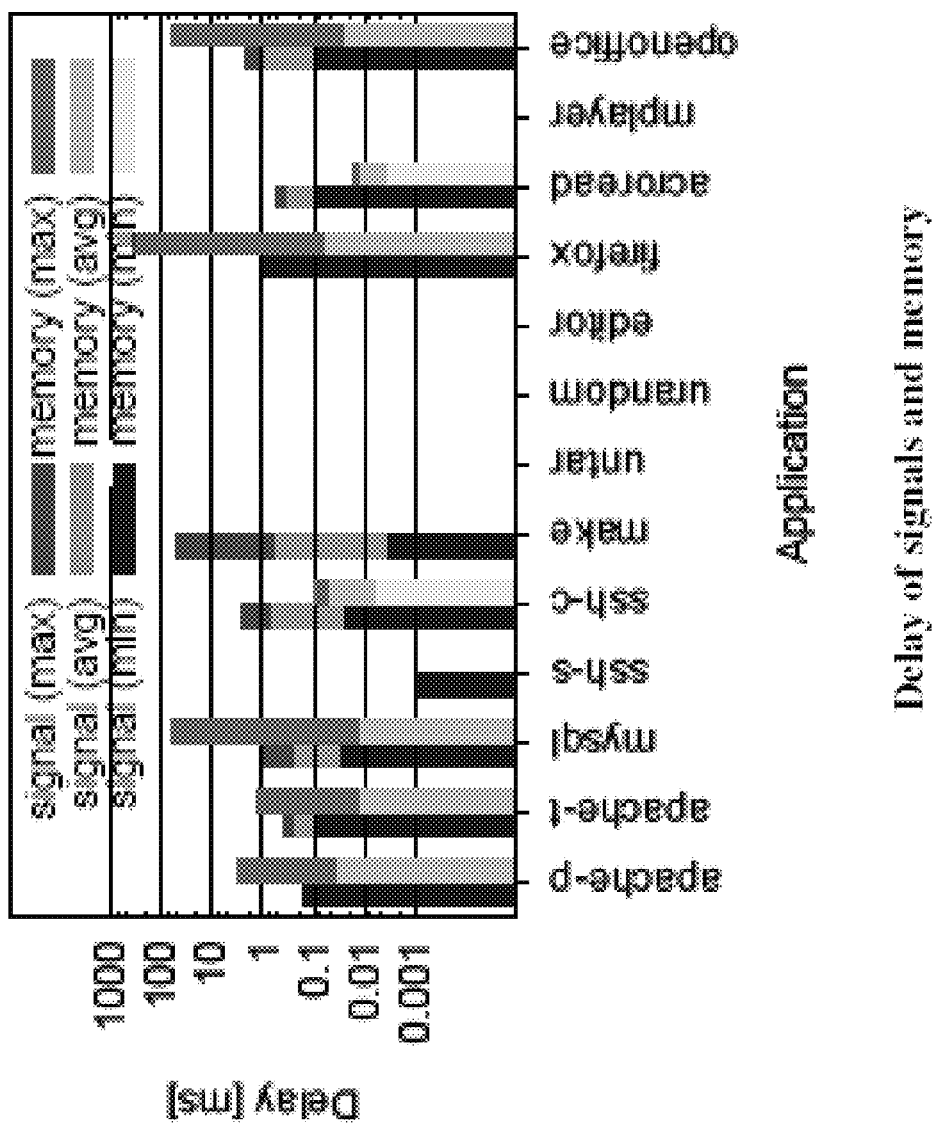
FIG. 12 is a graph showing the delay incurred by deferred signals and shared memory accesses in accordance with some embodiments of the disclosed subject matter.

FIG. 12 is a graph showing the delay incurred by deferred signals and shared memory accesses. Referring to FIG. 12, deferred signals or shared memory accesses were delayed for at most 1 ms on average. As expected, this delay is similar to the average time interval between sync points. With the exception of ssh-c, the average delay for deferred shared memory accesses was less than 0.1 ms. Furthermore, the maximum delay observed was under 50 ms for signal events, and 80 ms for memory events, for all scenarios except firefox. For firefox, there was a single instance where a memory event was detained for nearly 500 ms. However, the average delay for memory events for firefox was only 60 µs.

Through all the executions of the application scenarios, situations in which a process failed to reach a sync point in a reasonable time, or at all, were not observed. Although a mechanism is in place to deal with delays that become too large, this functionality was not needed in practice. The experiences and results demonstrate that sync points occur frequently and are useful for enabling deterministic replay.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for recording execution of an application running on a computer system using a program module, the method comprising:
    detecting a non-deterministic event associated with a process of the application;
    deferring recordation of the non-deterministic event until the process enters a kernel mode, wherein the process enters the kernel mode at an occurrence of a deterministic event;
    when the process enters the kernel mode, recording the non-deterministic event;
    and saving the recorded event for deterministic replay.

2. The method of claim 1, wherein the program module comprises a dynamically loaded kernel module.

3. The method of claim 1, further comprising providing, by the program module, a virtual execution environment for encapsulating one or more processes of the application in a self-contained unit.

4. The method of claim 3, further comprising:
    suspending live execution of the application;
    saving a live execution state of the application; and
    resuming execution of the application in the virtual execution environment.

5. The method of claim 1, further comprising:
    identifying a plurality of non-deterministic events relating to a shared resource;
    recording an ordering of the plurality of non-deterministic events for the shared resource; and
    storing the recorded ordering of the plurality of non-deterministic events for the shared resource for deterministic replay.

6. The method of claim 1, wherein detecting the non-deterministic event associated with the process comprises detecting a signal addressed to the process of the application.

7. The method of claim 1, wherein detecting the non-deterministic event associated with the process comprises detecting a request for transfer of access right to a page in a shared memory to another process of the application.

8. The method of claim 1, further comprising:
restoring the saved recorded event; and
deterministically replaying the recorded event.

9. The method of claim 1, wherein the process is configured to enters the kernel mode when the process invokes a system call, accesses a memory address that causes a memory fault, or attempts to perform a division by zero.

10. The method of claim 5, wherein identifying the plurality of non-deterministic events relating to the shared resource comprises detecting a plurality of system calls for operating on a pipe between processes of the application.

11. The method of claim 5, wherein identifying the plurality of non-deterministic events relating to the shared resource comprises detecting a plurality of system calls for modifying memory layout.

12. The method of claim 6, wherein the signal is addressed to the process of the application by another process of the application running on the computer system.

13. A system for recording execution of an application, the system comprising:
a processor for running:
the application; and
a program module, wherein the program module is configured to:
detect a non-deterministic event associated with a process of the application;
defer recordation of the non-deterministic event until the process enters a kernel mode, wherein the process enters the kernel mode at an occurrence of a deterministic event;
when the process enters the kernel mode, record the non-deterministic event; and
save the recorded event for deterministic replay.

14. The system of claim 13, wherein the program module is configured to provide a virtual execution environment for encapsulating one or more processes of the application in a self-contained unit.

15. The system of claim 14, wherein the program module is further configured to:
suspend live execution of the application;
save the live execution state of the application; and
resume execution of the application in the virtual execution environment.

16. The system of claim 13, wherein the non-deterministic event comprises a receipt of a signal addressed to the process of the application.

17. The system of claim 13, further comprising a shared memory, wherein the non-deterministic event comprises a receipt of a request for transfer of access right to a page in the shared memory to another process.

18. The system of claim 13, wherein the program module is configured to:
identify a plurality of non-deterministic events relating to a shared resource;
record an ordering of the plurality of non-deterministic events for the shared resource; and
store the recorded ordering of the plurality of non-deterministic events for the shared resource for deterministic replay.

19. The system of claim 18, wherein the plurality of non-deterministic events relating to the shared resource comprises a plurality of system calls for accessing shared mapped files.

20. The system of claim 18, wherein the plurality of non-deterministic events relating to the shared resource comprises a plurality of system calls for operating on a pipe between processes of the application.

* * * * *

UNITED STATES PATENT AND TRADEMARK OFFICE
CERTIFICATE OF CORRECTION

PATENT NO. : 8,402,318 B2
APPLICATION NO. : 12/729944
DATED : March 19, 2013
INVENTOR(S) : Jason Nieh et al.

Page 1 of 1

It is certified that error appears in the above-identified patent and that said Letters Patent is hereby corrected as shown below:

In the Specification

On column 1, after line 11, add:

-- STATEMENT REGARDING FEDERALLY SPONSORED RESEARCH OR DEVELOPMENT

This invention was made with government support under Grant Nos. NSF CNS0905246 and NSF CNS0914845 awarded by the National Science Foundation, and Grant No. FA9550-07-1-0527 awarded by the United States Air Force/Air Force Office of Scientific Research. The government has certain rights in the invention. --

Signed and Sealed this
First Day of October, 2013

Teresa Stanek Rea
*Deputy Director of the United States Patent and Trademark Office*